United States Patent
Shen et al.

(10) Patent No.: US 10,046,500 B2
(45) Date of Patent: Aug. 14, 2018

(54) 3D PRINTER SPRAY NOZZLE STRUCTURE AND METHOD THEREOF FOR CONTROLLING SPEED AND PRECISION

(71) Applicant: CLOUD COMPUTING CENTER CHINESE ACADEMY OF SCIENCES, DongGuan, Guangdong (CN)

(72) Inventors: Zhen Shen, Guangdong (CN); Xue Liu, Guangdong (CN); Gang Xiong, Guangdong (CN); Feiyue Wang, Guangdong (CN)

(73) Assignee: CLOUD COMPUTING CENTER CHINESE ACADEMY OF SCIENCES, DongGuan, Guangdong (CN)

( * ) Notice: Subject to any disclaimer, the term of this patent is extended or adjusted under 35 U.S.C. 154(b) by 390 days.

(21) Appl. No.: 14/778,116

(22) PCT Filed: Jul. 18, 2014

(86) PCT No.: PCT/CN2014/082513
§ 371 (c)(1),
(2) Date: Sep. 18, 2015

(87) PCT Pub. No.: WO2016/004641
PCT Pub. Date: Jan. 14, 2016

(65) Prior Publication Data
US 2016/0288395 A1 Oct. 6, 2016

(30) Foreign Application Priority Data

Jul. 11, 2014 (CN) .......................... 2014 1 0331883

(51) Int. Cl.
*B29C 47/00* (2006.01)
*B29C 47/08* (2006.01)
(Continued)

(52) U.S. Cl.
CPC ...... *B29C 47/0854* (2013.01); *B29C 47/0801* (2013.01); *B29C 47/10* (2013.01);
(Continued)

(58) Field of Classification Search
None
See application file for complete search history.

(56) References Cited

U.S. PATENT DOCUMENTS

| | | | | |
|---|---|---|---|---|
| 2014/0061974 A1* | 3/2014 | Tyler | ................ | B29C 67/0055 264/401 |
| 2015/0352797 A1* | 12/2015 | Kanada | ................ | D01F 6/625 428/212 |
| 2017/0217100 A1* | 8/2017 | Gardiner | ............ | B29C 67/0088 |

* cited by examiner

*Primary Examiner* — Paul Yanchus, III

(57) ABSTRACT

The present invention relates to a technical field of 3D printing, and more particularly to a 3D printer spray nozzle structure and a method thereof for controlling speed and precision. According to the present invention, a feeding pipeline is embedded in an external shell, the feeding pipeline and an extruder are coaxially connected; the extruder is driven by a driving device, so as to rotate relative to the feeding pipeline. A rotation angle of the extruder relative to the feeding pipeline is controlled by rotation of a motor, for controlling a filament area actually sprayed by the extrude, in such a manner that printing speed and precision is controlled for suiting different requirements of different printing area. The present invention controls the printing speed and precision, for improving overall printing speed with precision requirements satisfied, and is applicable to 3D printer spray nozzle structure and controlling.

7 Claims, 4 Drawing Sheets

(51) Int. Cl.
  *B33Y 30/00* (2015.01)
  *B33Y 50/02* (2015.01)
  *B29C 47/10* (2006.01)
  *B29C 47/80* (2006.01)
  *B29C 47/92* (2006.01)
  *B29C 67/00* (2017.01)
  *B29K 55/02* (2006.01)
  *B29K 67/00* (2006.01)

(52) U.S. Cl.
  CPC ............ *B29C 47/802* (2013.01); *B29C 47/92* (2013.01); *B29C 67/0085* (2013.01); *B29C 67/0088* (2013.01); *B33Y 30/00* (2014.12); *B33Y 50/02* (2014.12); *B29C 67/0055* (2013.01); *B29C 2947/9258* (2013.01); *B29K 2055/02* (2013.01); *B29K 2067/046* (2013.01)

3D PRINTER SPRAY NOZZLE STRUCTURE AND METHOD THEREOF FOR CONTROLLING SPEED AND PRECISION

CROSS REFERENCE OF RELATED APPLICATION

This is a U.S. National Stage under 35 U.S.C 371 of the International Application PCT/CN2014/082513, filed Jul. 18, 2014, which claims priority under 35 U.S.C. 119(a-d) to CN 201410331883.4, filed Jul. 11, 2014.

BACKGROUND OF THE PRESENT INVENTION

Field of Invention

The present invention relates to a technical field of 3D printing, and more particularly to a 3D printer spray nozzle structure and a method thereof for controlling speed and precision.

Description of Related Arts 3D printing is one of rapid prototyping technologies, which uses software for hierarchical discretization of 3D digital models, then uses adhesive materials such as powdered metal or plastic materials, for constructing an object through stacking layer by layer. 3D printing technology belongs to plus manufacturing, which is different from the traditional minus manufacturing, and is better in saving raw materials. Promoted by manufacturing requirements of personalized and specialized services, 3D printing has been applied in mold production, personalized product manufacturing, medical, military and other aspects. In the near future, 3D printers will be popular in public families, and service for our life and work.

Common 3D printing technologies comprise fuse deposition technology, which melts filamentous hot-melt materials, and extrudes through a spray nozzle with a micro channel. After being sprayed by the spray nozzle, the filamentous hot-melt materials are deposited on a workbench, and are solidified when a temperature is lower than a solidifying temperature. Finally a product is formed by stacking the materials. The spray nozzle is a core part, but an inner cross section of an extruder of the spray nozzle of a conventional 3D printer is only circular. In a unit time, a fuse volume of the spray nozzle is certain. Due to the inner cross section of the spray nozzle is not adjustable, printing precision and speed and the 3D printer are not able to be controlled. However, for different printing purposes and different print areas, different printing precision and speed are needed. Even for one model, inner and edge precision requirements are different. Based on the fact that the inner cross section of the spray nozzle of the conventional 3D printer is circular, printing speed and precision are not able to be controlled according to different models or different parts of a same model.

SUMMARY OF THE PRESENT INVENTION

A first object of the present invention is to provide a 3D printer spray nozzle whose printing speed and precision are adjustable, aiming at a problem that internal cross section shapes of conventional 3D printer spray nozzles are all circular, which are not controllable according to different models or different parts of a same model.

A second object of the present invention is to provide a method for controlling printing speed and precision according to printing requirements, aiming at a problem that internal cross section shapes of conventional 3D printer spray nozzles are all circular, which are not controllable according to different models or different parts of a same model.

Accordingly, in order to accomplish the first object, the present invention provides a 3D printer spray nozzle structure, comprising:

a feeding pipeline, and an extruder, wherein the extruder is arranged under the feeding pipeline; wherein the extruder is rotatable relative to the feeding pipeline, so as to adjust a cross section area of a sprayed filament.

The 3D printer spray nozzle structure further comprises an external shell and a driving device, wherein the feeding pipeline is embedded in the external shell, the feeding pipeline and the extruder are coaxially connected; the extruder is driven by the driving device, so as to rotate relative to the feeding pipeline.

The driving device comprises a driving gear, a driven gear and a motor; wherein the driving gear is mounted inside the external shell, the driven gear is mounted on the extruder; the driving gear is engaged with the driven gear; the motor drives the driving gear; the driven gear is driven by the driving gear, so as to drive the extruder to rotate.

The driven gear is mounted at a top end of the extruder.

A barycenter of an internal channel cross section shape of the feeding pipeline and a barycenter of an internal channel cross section shape of the extruder are at one axle perpendicular to both an internal channel cross section of the feeding pipeline and an internal channel cross section of the extruder; the extruder is rotatable around the axle.

The internal channel cross section shape of the feeding pipeline and the internal channel cross section shape of the extruder are both regular polygons.

The regular polygons comprise triangles and rectangles.

The internal channel cross section shape of the feeding pipeline and the internal channel cross section shape of the extruder are both the triangle with a side length of 3a; a rotation angle of the extruder around the axle perpendicular to both the internal channel cross section of the feeding pipeline and the internal channel cross section of the extruder is θ, an area of a coincide region of both the internal channel cross section of the feeding pipeline and the internal channel cross section of the extruder equals to a cross section area S of materials actually extruded by the extruder in a unit time; then $$S = \frac{9\sqrt{3}}{4} \frac{1+\tan^2\frac{\theta}{2}}{1+\sqrt{3}\,\tan\frac{\theta}{2}} a^2,$$

wherein a motor-driven rotation angle of the extruder is θ.

The external shell comprises a heater therein, for heating the materials transported in the feeding pipeline, in such a manner that the materials are in a melted state; the materials transported are ABS or PLA fusible material.

Accordingly, in order to accomplish the second object, the present invention provides a method for controlling printing speed and precision, wherein:

a method for controlling the printing speed comprises steps of:

defining a printing speed V=K*S*L; wherein S is a cross section area of a filament actually sprayed by an extruder, L is a unit printing forming area, K is a printing related constant;

determining a feeding speed by the cross section area S of the filament actually sprayed by the extruder and the unit printing forming area L, wherein a melting speed is also affected; the feeding speed and the melting speed together determine the printing speed; and forming a signal referring to changes of S and L for controlling the printing speed, which also adjusting the feeding speed of a feeding pipeline of a spray nozzle;

wherein a method for controlling the printing precision comprises steps of: according to different precision requirements, adjusting the printing speed for controlling printing precision; wherein, when high printing precision is required, the printing speed is slow; when low printing precision is required, the printing speed is high.

A rotation angle of the extruder is adjusted by a motor for changing the cross section area S of the filament actually sprayed by the extruder in a unit time; because a working moving speed of the spray nozzle is constant, for ensuring Z-axis forming heights of all layers are identical, the feeding speed of the feeding pipeline is real-time controlled according to the cross section area S of the filament actually sprayed by the extruder; the feeding speed equals in value to the melting speed of materials transported, and also equals to the printing speed V during printer working.

When an internal channel cross section shape of the feeding pipeline and an internal channel cross section shape of the extruder are both a triangle with a side length of 3a, the cross section area S of the filament actually sprayed by the extruder is:

$$S = \frac{9\sqrt{3}}{4} \frac{1+\tan^2\frac{\theta}{2}}{1+\sqrt{3}\,\tan\frac{\theta}{2}} a^2,$$

wherein θ is a motor-driven rotation angle of the extruder.

Beneficial Effects:

The present invention controls rotation of the motor for controlling the rotation angle of the extruder relative to the feeding pipeline, in such a manner that the cross section area of the sprayed filament is controlled for controlling the printing precision and speed of a printer. The present invention is able to adjust different printing precision and speed according to different printing purposes and different printing areas.

BRIEF DESCRIPTION OF THE DRAWINGS

Referring to drawings, the present invention is further illustrated.

wherein: a-perspective view of a feeding pipeline; b-top view of the feeding pipeline;

c-perspective view of an extruder; d-top view of the extruder.

Figure 3:
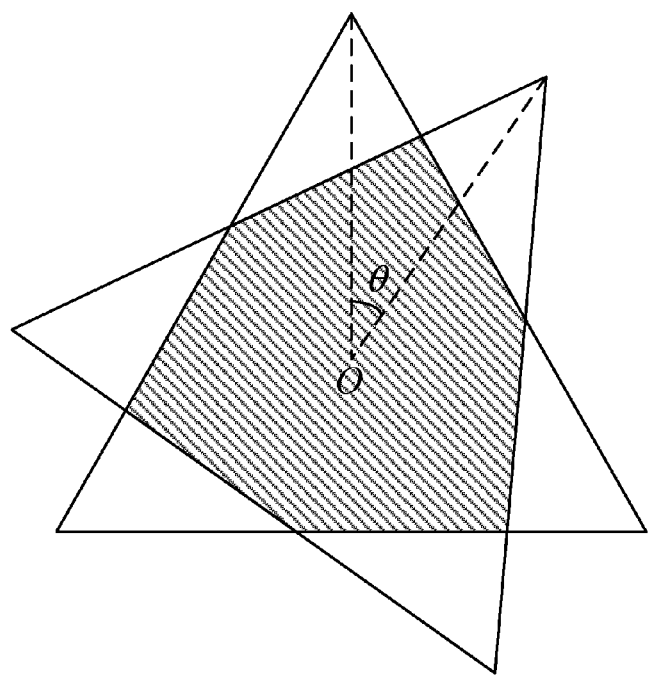

FIG. 3 is a top view of an internal channel cross section of the feeding pipeline and an internal channel cross section of the extruder according to the present invention, wherein O is barycenters of two identical equilateral triangles, θ is an angle between perpendicular bisectors thereof.

Figure 4:
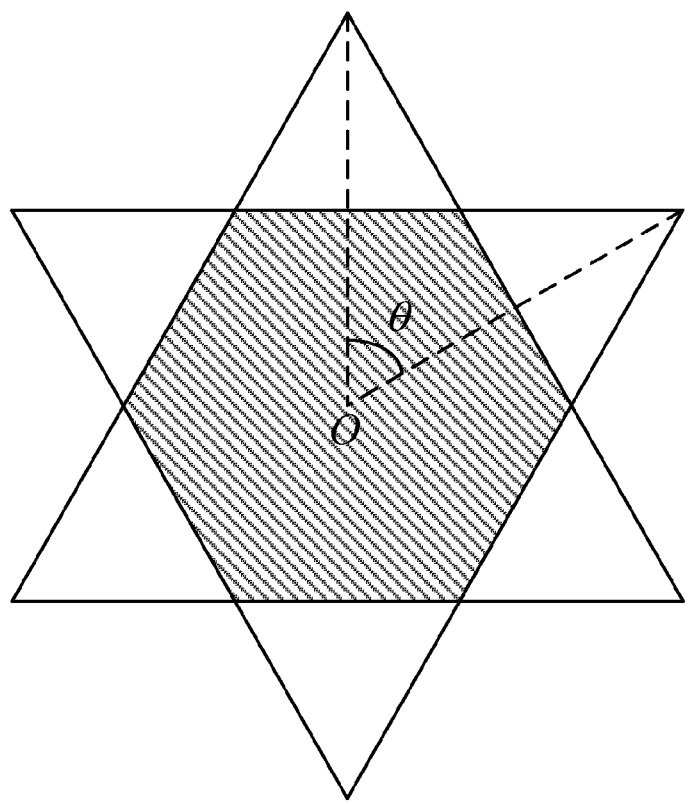

FIG. 4 is a top view of the internal channel cross section of the feeding pipeline and the internal channel cross section of the extruder when θ=π/3.

Figure 5:
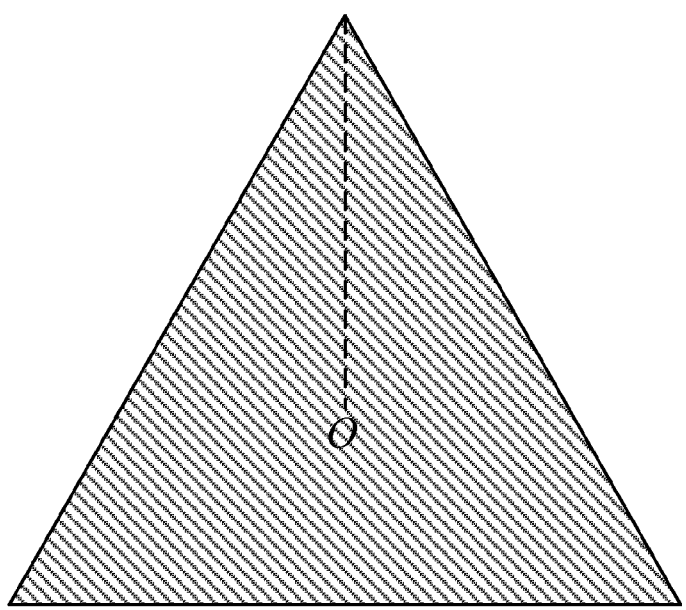

FIG. 5 is a top view of the internal channel cross section of the feeding pipeline and the internal channel cross section of the extruder when θ=0.

Figure 6:
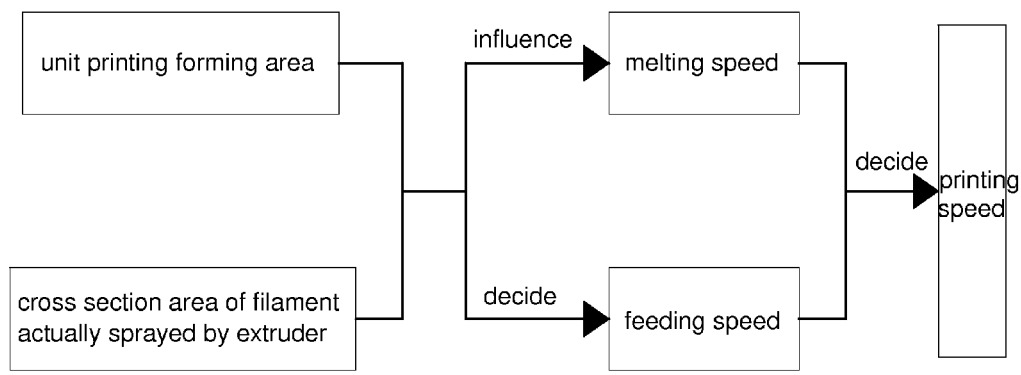

FIG. 6 is a logic diagram of factors influencing a printing speed according to the present invention.

Figure 7:
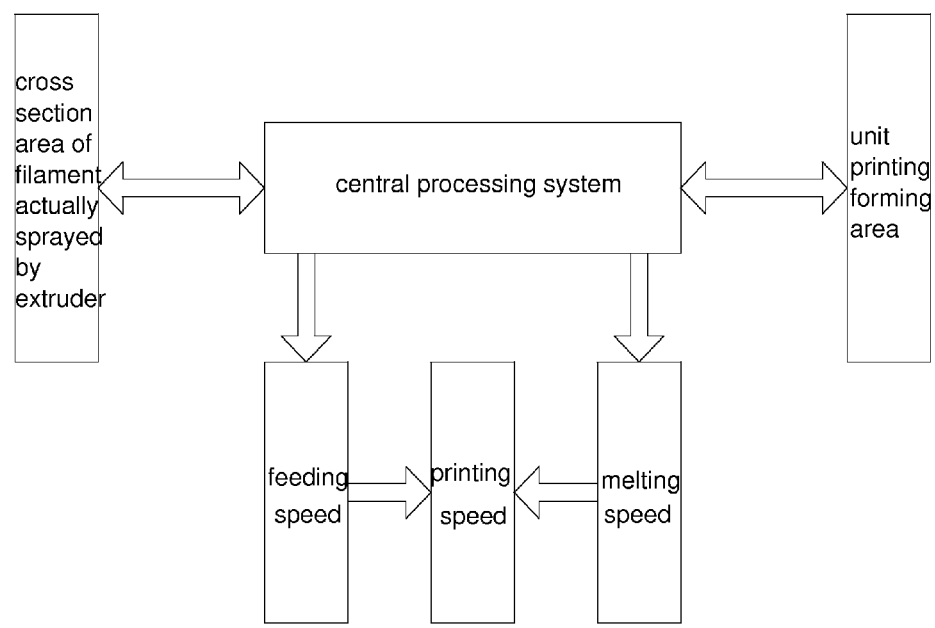

FIG. 7 is a system diagram of controlling the printing speed according to the present invention.

DETAILED DESCRIPTION OF THE PREFERRED EMBODIMENT

Figure 1:
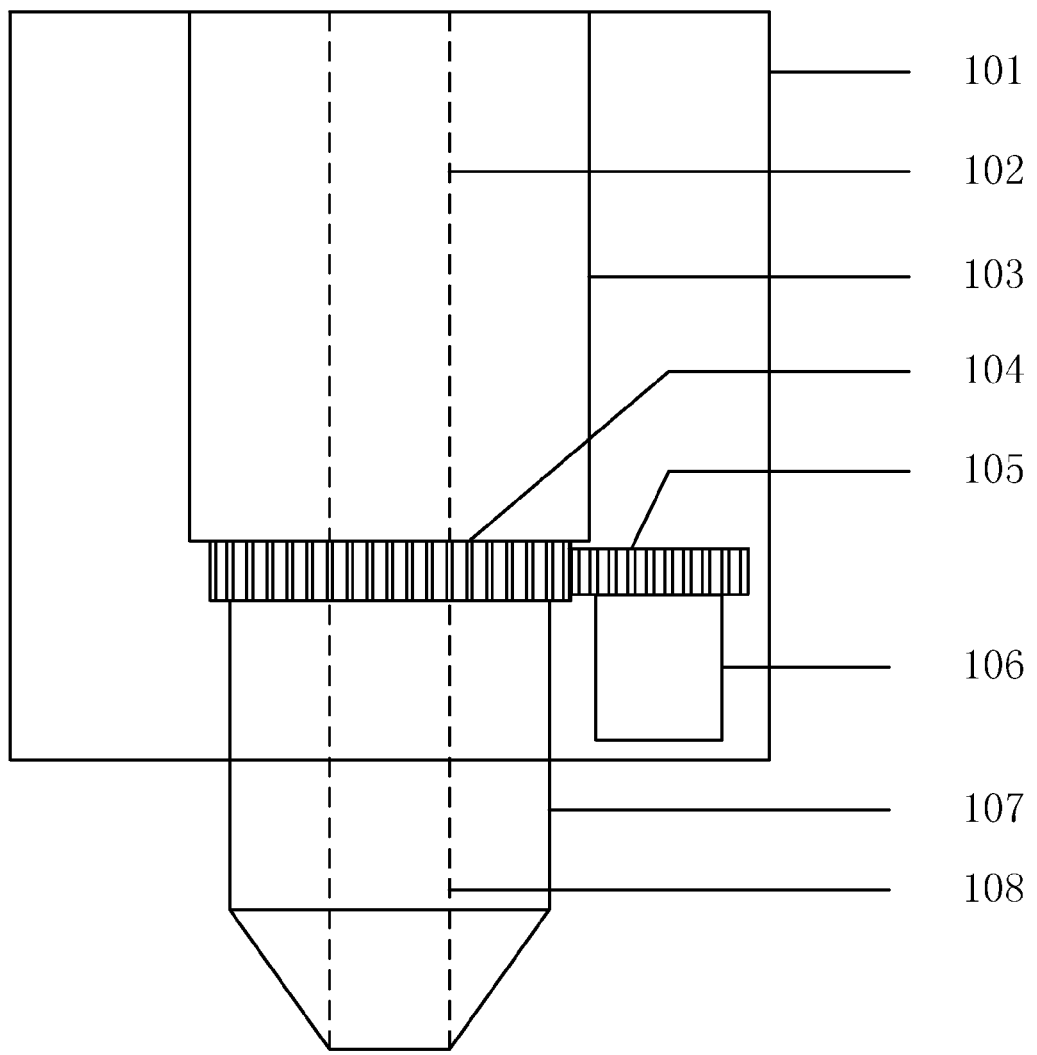
FIG. 1 is a front view of a printer spray nozzle according to the present invention.
Figure 2:
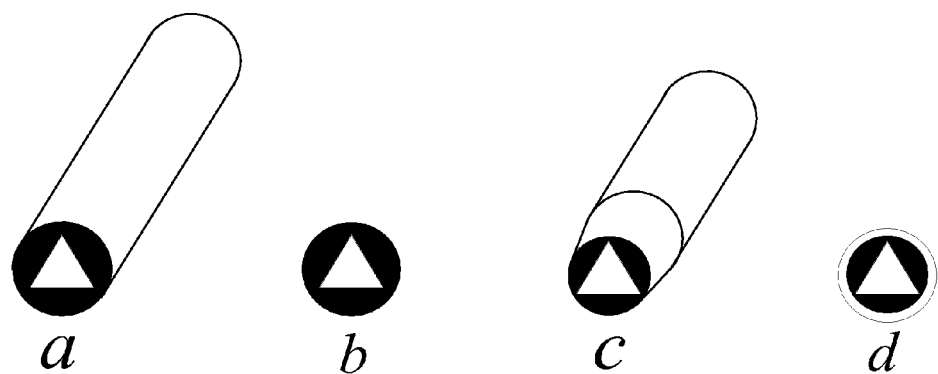
FIG. 2 is a sketch view of main components of the printer spray nozzle according to the present invention.

Referring to FIG. 1, a front view of a 3D printer spray nozzle according to the present invention is illustrated, wherein main components thereof are illustrated in FIG. 2, comprising a feeding pipeline 103, an extruder 107 and an external shell 101, wherein the feeding pipeline 103 and the external shell 101 are mounted on a printer body, the feeding pipeline 103 is embedded in the external shell 101. The external shell 101 comprises a heater therein, for heating materials transported in the feeding pipeline 103, in such a manner that the materials are in a melted state; the materials transported are ABS or PLA fusible materials.

The feeding pipeline 103 and the extruder 107 are coaxially connected. An internal channel 102 cross section shape of the feeding pipeline 103 and an internal channel 108 cross section shape of the extruder 107 are both regular polygons, wherein the regular polygons comprise triangles and rectangles; wherein a barycenter of the internal channel 102 cross section shape of the feeding pipeline 103 and a barycenter of the internal channel cross section shape 108 of the extruder 107 are at one axle perpendicular to both an internal channel cross section of the feeding pipeline 103 and an internal channel cross section of the extruder 107.

A driven gear 104 is mounted at a top portion of the extruder 107. The driven gear 104 drives the extruder 107 to rotate by rotation. A motor inside the external shell 101 rotates for rotating a main axle 106, and a driving gear 105 is mounted on the main axle 106, which drives a driven gear 104 to rotate. The present invention accurately controls a rotation number of the motor through software, so as to control a rotation angle θ of the extruder 107 around an axle perpendicular to both the internal channel 102 cross section of the feeding pipeline 103 and the internal channel 108 cross section of the extruder 107.

Referring to FIG. 3, the rotation angle of the extruder 107 around the axle perpendicular to both the internal channel 102 cross section of the feeding pipeline 103 and the internal channel 108 cross section of the extruder 107 is θ; wherein a shadowed area is a coincide region of an internal channel 102 cross section triangle of the feeding pipeline 103 and an internal channel 108 cross section triangle of the extruder 107; an area of the coincide region equals to a cross section area of the materials actually extruded by the extruder 107 in a unit time.

Referring to a preferred embodiment, the present invention is further illustrated. The internal channel 102 cross section shape of the feeding pipeline 103 and the internal channel 108 cross section shape of the extruder 107 are both the equilateral triangle with a side length of 3a; the rotation angle of the extruder 107 is θ, the area of the coincide region of both the internal channel 102 cross section of the feeding pipeline 103 and the internal channel 108 cross section of the extruder 107 equals to a shadowed cross section area S of in FIG. 3; then $$S = \frac{9\sqrt{3}}{4} \frac{1+\tan^2\frac{\theta}{2}}{1+\sqrt{3}\tan\frac{\theta}{2}} a^2,$$

wherein θ is adjusted by the motor for changing the cross section area S of the materials actually sprayed by the extruder 107 in a unit time; because a working moving speed of the spray nozzle is constant, for ensuring Z-axis forming heights of all layers are identical, the feeding speed of the feeding pipeline 103 is real-time controlled according to the cross section area S of the materials actually sprayed by the extruder 107; the feeding speed equals in value to the melting speed of materials transported, and also equals to the printing speed V during printer working.

Referring to FIGS. 4 and 7, when the area of the shadowed area is smallest, the printing speed is lowest, which is suitable for conditions with high printing precision requirement. Referring to FIG. 5, when the area of the shadowed area is largest, the printing speed is highest, which is suitable for conditions with low printing precision requirement, for shortening a printing time. That is to say, according to different precision requirements, the printing speed is adjusted for controlling printing precision; wherein, when high printing precision is required, the printing speed is slow; when low printing precision is required, the printing speed is high.

Referring to FIGS. 6 and 7, according to the present invention, a method for controlling the printing speed comprises steps of:

defining a printing speed V=K*S*L; wherein S is a cross section area of a filament actually sprayed by an extruder, L is a unit printing forming area, K is a printing related constant;

wherein the unit printing forming area is a top surface area formed by extruding the materials along a same direction within a unit time by the extruder 107;

determining a feeding speed by the cross section area S of the filament actually sprayed by the extruder and the unit printing forming area L, wherein a melting speed is also affected; the feeding speed and the melting speed together determine the printing speed; and forming a signal referring to changes of S and L for controlling the printing speed, which also adjusting the feeding speed of a feeding pipeline of a spray nozzle.

What is claimed is:

1. A 3-dimensional printer spray nozzle structure, comprising: a feeding pipeline, an extruder, an external shell and a driving device, wherein the extruder is arranged under the feeding pipeline; wherein the extruder is rotatable relative to the feeding pipeline, so as to adjust a cross section area of a sprayed filament;
wherein the feeding pipeline is embedded in the external shell, the feeding pipeline and the extruder are coaxially connected; the extruder is driven by the driving device, so as to rotate relative to the feeding pipeline; wherein the driving device comprises a driving gear, a driven gear and a motor; wherein the driving gear is mounted inside the external shell, the driven gear is mounted on the extruder; the driving gear is engaged with the driven gear; the motor drives the driving gear; the driven gear is driven by the driving gear, so as to drive the extruder to rotate;
wherein the driven gear is mounted at a top end of the extruder;
wherein a barycenter of an internal channel cross section shape of the feeding pipeline and a barycenter of an internal channel cross section shape of the extruder are at one axle perpendicular to both an internal channel cross section of the feeding pipeline and an internal channel cross section of the extruder; the extruder is rotatable around the axle.

2. The 3-dimensional printer spray nozzle structure, as recited in claim 1, wherein a barycenter of an internal channel cross section shape of the feeding pipeline and a barycenter of an internal channel cross section shape of the extruder are at one axle perpendicular to both an internal channel cross section of the feeding pipeline and an internal channel cross section of the extruder; the extruder is rotatable around the axle.

3. The 3-dimensional printer spray nozzle structure, as recited in claim 1, wherein the internal channel cross section shape of the feeding pipeline and the internal channel cross section shape of the extruder are both regular polygons.

4. The 3-dimensional printer spray nozzle structure, as recited in claim 2, wherein the internal channel cross section shape of the feeding pipeline and the internal channel cross section shape of the extruder are both regular polygons.

5. The 3-dimensional printer spray nozzle structure, as recited in claim 3, wherein the regular polygons comprise triangles and rectangles.

6. The 3-dimensional printer spray nozzle structure, as recited in claim 5, wherein the internal channel cross section shape of the feeding pipeline and the internal channel cross section shape of the extruder are both the triangle with a side length of 3a; a rotation angle of the extruder around the axle perpendicular to both the internal channel cross section of the feeding pipeline and the internal channel cross section of the extruder is θ, an area of a coincide region of both the internal channel cross section of the feeding pipeline and the internal channel cross section of the extruder equals to a cross section area S of materials actually extruded by the extruder in a unit time; then $$S = \frac{9\sqrt{3}}{4} \frac{1+\tan^2\frac{\theta}{2}}{1+\sqrt{3}\tan\frac{\theta}{2}} a^2$$

wherein a motor-driven rotation angle of the extruder is θ.

7. The 3-dimensional printer spray nozzle structure, as recited in claim 6, wherein the external shell comprises a heater therein, for heating the materials transported in the feeding pipeline, in such a manner that the materials are in a melted state; the materials transported are ABS or PLA fusible materials.

* * * * *